No. 828,358. PATENTED AUG. 14, 1906.
J. F. WHITE.
WAGON DUMP.
APPLICATION FILED FEB. 12, 1906.
5 SHEETS—SHEET 1.
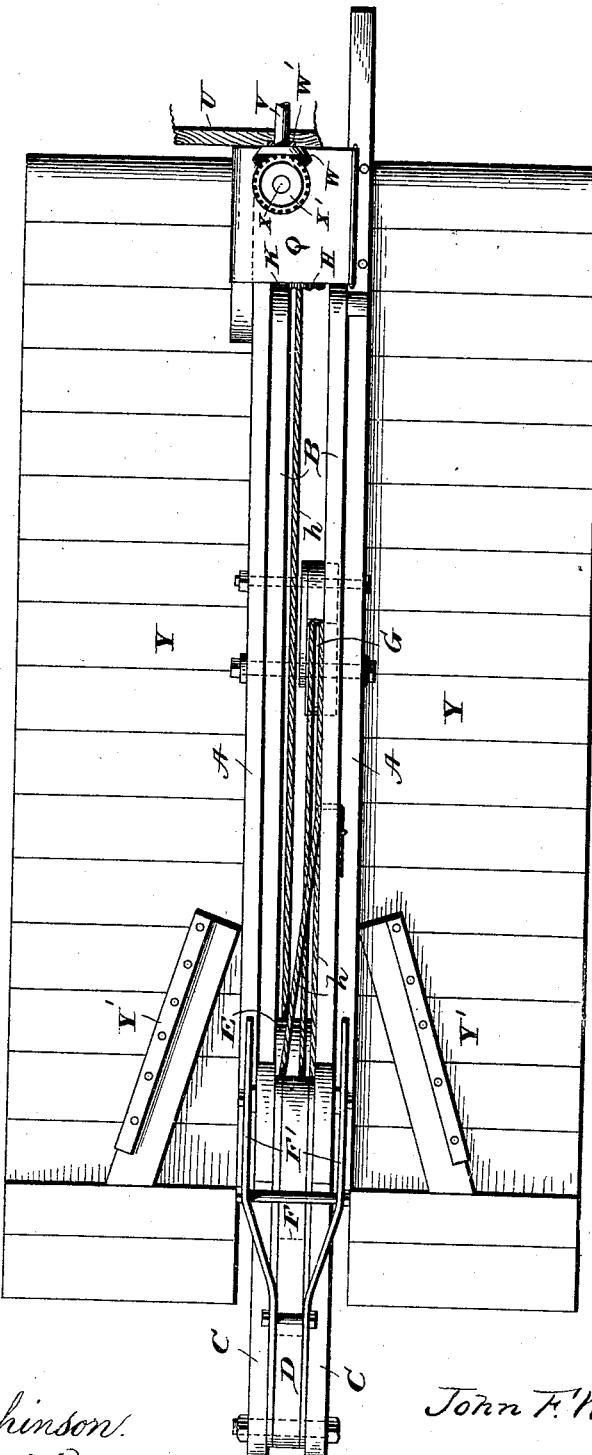
Witnesses:
Jas. E. Hutchinson
Thos. R. Strath
Inventor:
John F. White,
By MacMillan
Attorneys No. 828,358. PATENTED AUG. 14, 1906.
J. F. WHITE.
WAGON DUMP.
APPLICATION FILED FEB. 12, 1906.

5 SHEETS—SHEET 2.

Witnesses:
Jas. E. Hutchinson
Thos. R. Heath

Inventor:
John F. White,
By Warren Milans Atty's.

No. 828,358. PATENTED AUG. 14, 1906.
J. F. WHITE.
WAGON DUMP.
APPLICATION FILED FEB. 12, 1906.

5 SHEETS—SHEET 3.

Witnesses:
Jas. E. Hutchinson.
Thos. P. Heath

Inventor:
John F. White,
By Macdonald & Milans Atty's

No. 828,358.

PATENTED AUG. 14, 1906.

J. F. WHITE.
WAGON DUMP.
APPLICATION FILED FEB. 12, 1906.

5 SHEETS—SHEET 4.

Witnesses:
Jas. E. Hutchinson.
Thos. C. Heath

Inventor:
John F. White,
By MacIrvine Williams Attys.

No. 828,358. PATENTED AUG. 14, 1906.
J. F. WHITE.
WAGON DUMP.
APPLICATION FILED FEB. 12, 1906.

5 SHEETS—SHEET 5.

Witnesses:
Jas. E. Hutchinson
Tho. R. Strash

Inventor:
John F. White,
By Victor Williams Attorneys

UNITED STATES PATENT OFFICE.

JOHN F. WHITE, OF BLOOMINGTON, ILLINOIS.

WAGON-DUMP.

No. 828,358.　　　　Specification of Letters Patent.　　　Patented Aug. 14, 1906.

Application filed February 12, 1906. Serial No. 300,829.

*To all whom it may concern:*

Be it known that I, JOHN F. WHITE, a citizen of the United States, residing at Bloomington, in the county of McLean and State of Illinois, have invented certain new and useful Improvements in Wagon-Dumps, of which the following is a specification, reference being had therein to the accompanying drawings.
This invention relates to an improvement in wagon dumps or jacks of that type shown in my pending application, filed February 12, 1904, and bearing Serial No. 300,828; and the object of the present invention is the provision of gearing for both raising and lowering the jack.

A further object of the invention is the provision of means for automatically connecting the gearing of the hoisting mechanism with the drive-shaft of the elevator upon the lowering of the drag.

Figures 2, 8:
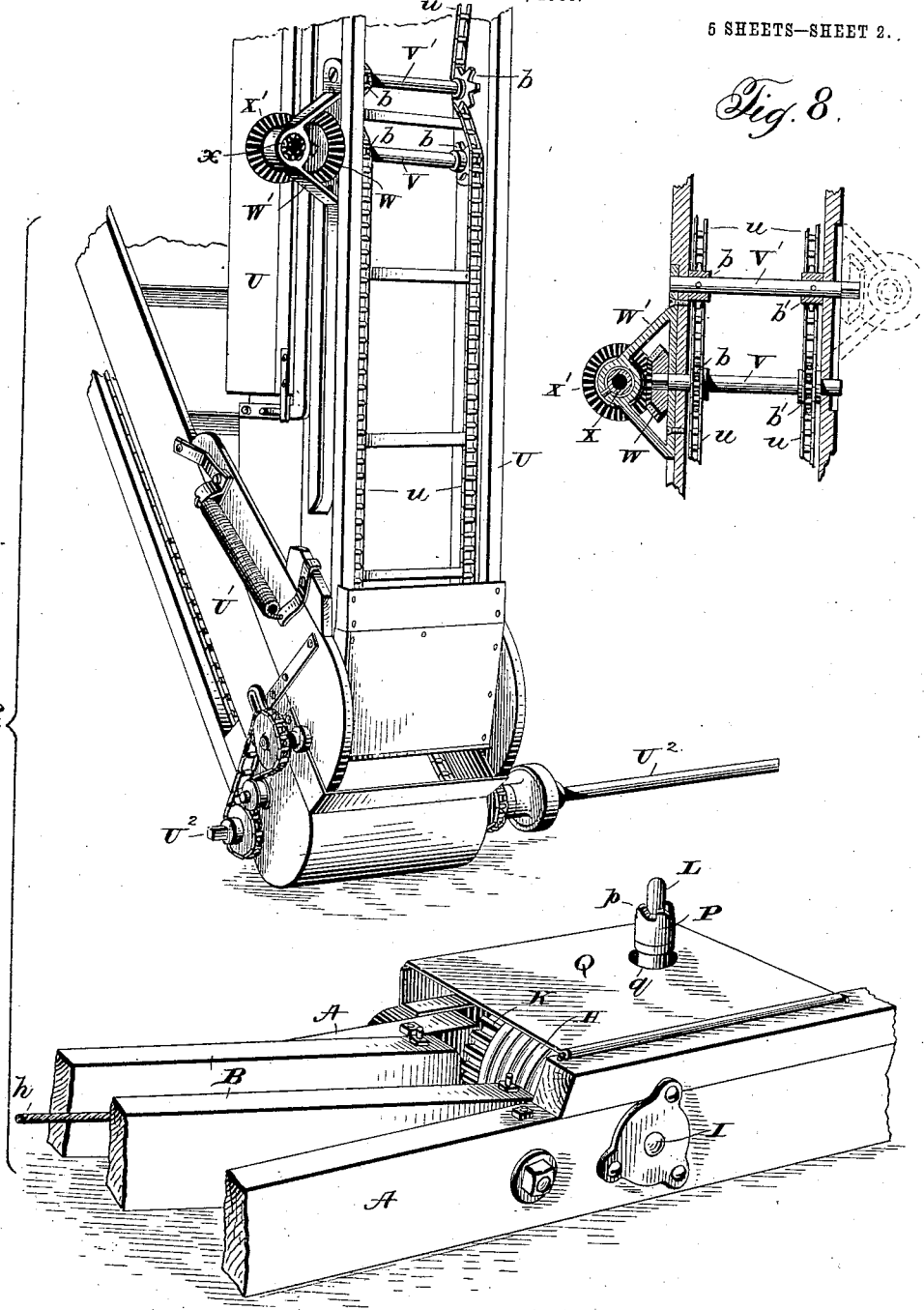
Figure 3:
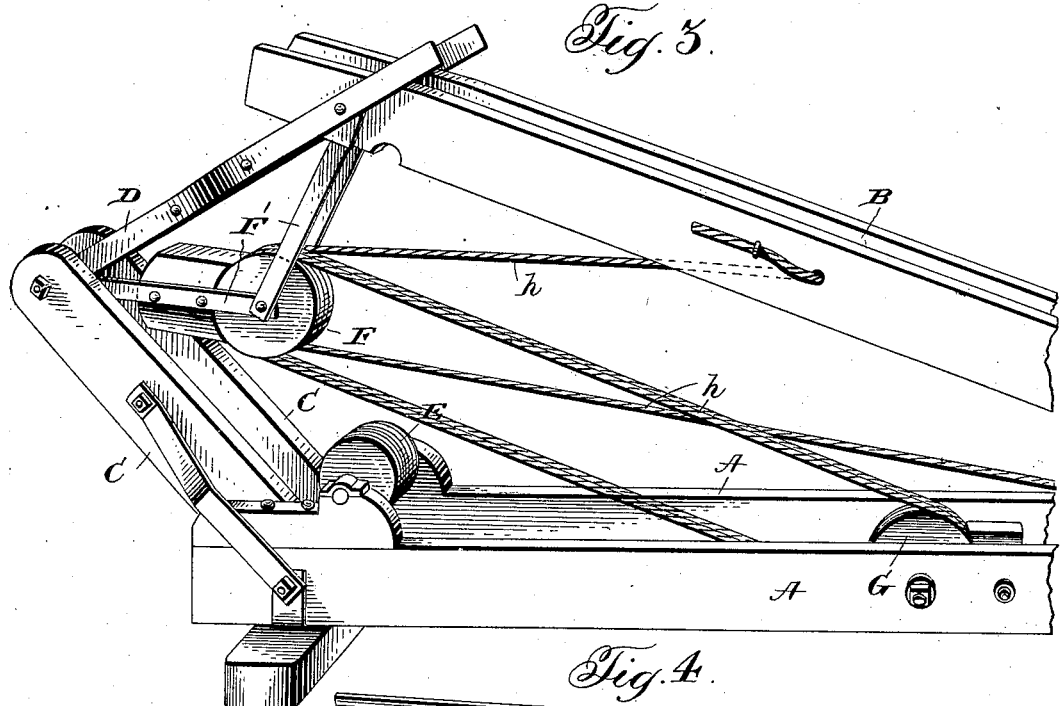
Figure 4:
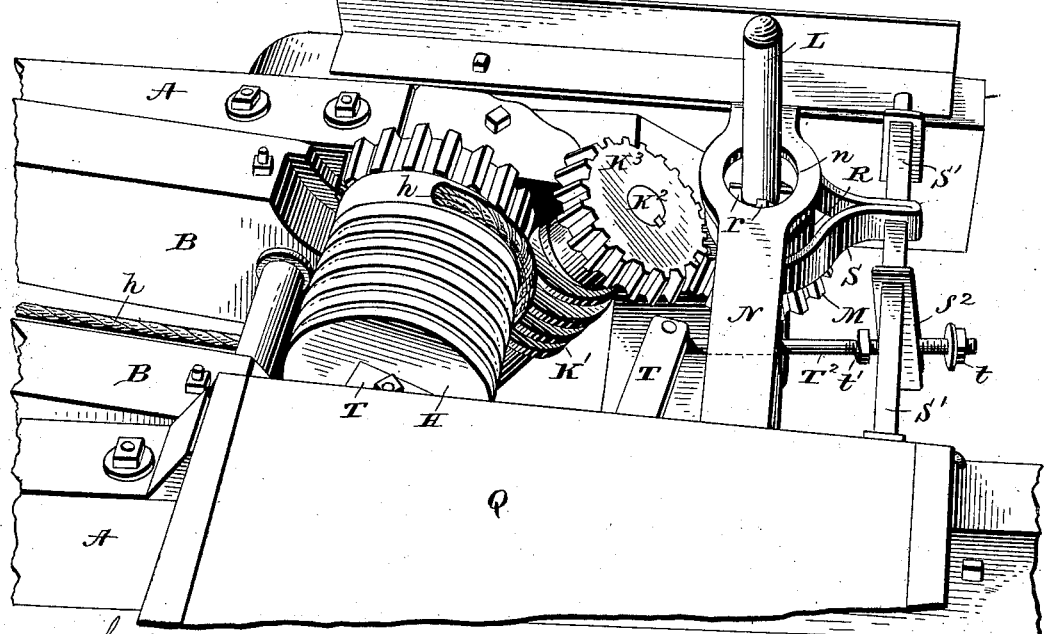
Figure 5:
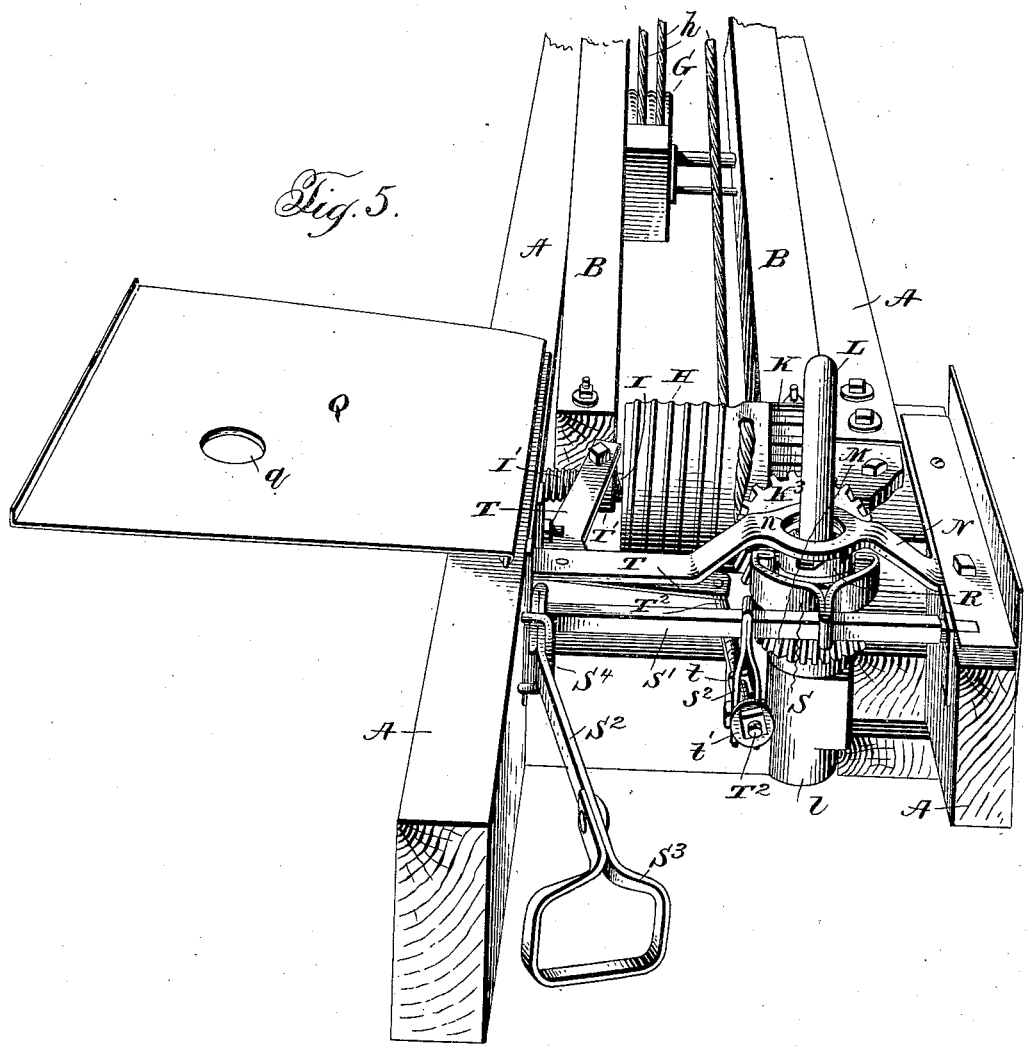
Figure 6:
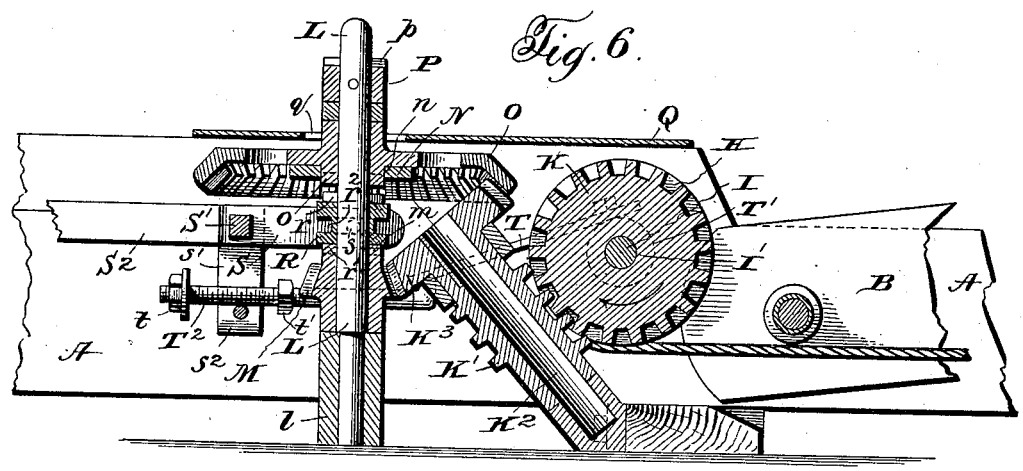
Figure 7:
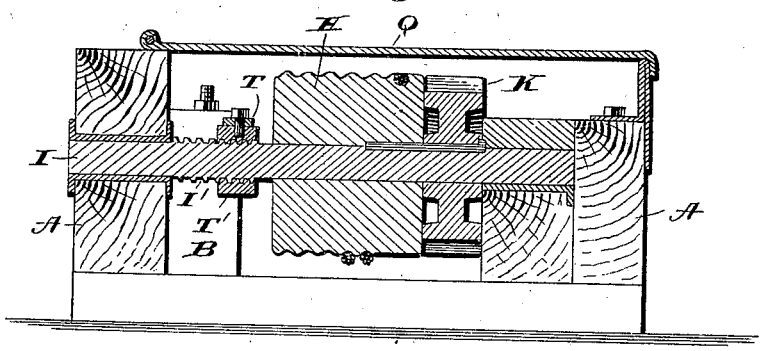

Other objects of the invention will be apparent from the detailed description hereinafter when read in connection with the accompanying drawings, forming a part hereof, wherein a preferable embodiment of my invention is shown and wherein like letters of reference refer to similar parts in the several views.
In the drawings, Figure 1 is a top plan view of my improved jack with the drag connected thereto, parts being broken away. Fig. 2 is a perspective view of the jack and drag with parts broken away, the drag being shown in its elevated position. Fig. 3 is a perspective view of the forward end of the jack. Figs. 4 and 5 are perspective views of the rear end of the jack, showing the gearing for actuating the same. Fig. 6 is a longitudinal section of the gearing for actuating the jack. Fig. 7 is a cross-section taken through the drum-shaft, and Fig. 8 is a detail sectional view showing the reversible gearing for connecting the drag to the jack.
Referring now more particularly to the drawings, A A designate a pair of spaced supporting-beams between which is pivoted the jack B, the free end of said jack being connected to said supporting-beams by links C and D, which are pivotally connected together at their inner ends and are pivotally connected at their outer ends, respectively, to said jack and supporting-beams, said links constituting a toggle which when straightened will effect the elevation of the jack.

E designates an idle pulley journaled in suitable bearings secured to the upper surfaces of the supporting-beams A A just in rear of the point of pivotal connection of the links C therewith.

F designates a sheave journaled in the apex portion of a V-shaped bracket F', the free ends of the arms of said brackets being secured to the bolts which form the pivotal connections of the link D respectively with the jack B and the link C.

The parts thus far described are substantially the same in construction as in my pending application hereinbefore referred to and need not, therefore, be described in detail.

G designates a sheave journaled between the supporting-beams A A some distance in rear of the idler E. A cable $h$ passes from a hoisting-drum H, to be hereinafter more particularly described, over the idler E, under and around the sheave F, over and around the sheave G, under and around the sheave F, over and around the sheave G, and under and around the sheave F, the free end of said cable being secured to one of the beams of the jack B. When power is applied to the drum H to wind up the cable $h$, a direct upward pull will be obtained upon the sheave F until the same is elevated above the upper surface of the idler E, when the pull will be directed upon the sheave F, as in the construction disclosed in my pending application. By journaling the sheave G between the supporting-beams A A, however, instead of between the jack-beams, as in the construction described in my other application, I am enabled to straighten the links C and D to a greater extent by the upward pull upon the sheave F, thereby rendering the elevation of the jack easier, as it tends to equalize the power required to raise the jack at all points.

I designates a drum-shaft journaled between extensions of the supporting-beams A A, and H designates a hoisting-drum secured thereon so as to rotate therewith. K designates a gear-wheel keyed to said shaft at one side of said drum and meshing with a worm K', which is secured to an inclined worm-shaft $K^2$, journaled in suitable bearings secured to the inner side of one of the supporting-beams A.

$K^3$ designates a beveled gear-wheel secured to the upper end of the inclined shaft $K^2$.

L designates a vertically-disposed shaft arranged just in rear of the worm-shaft K², the lower end of which is journaled in a suitable bearing l, carried by a cross-bar secured to the under side of the supporting-beams A A.

M designates a beveled gear loosely mounted on the shaft L and meshing with the lower side of the gear-wheel K³, secured to the upper end of the worm-shaft K², said gear-wheel being supported upon the upper surface of the bearing l. The gear-wheel M has formed integral with the upper surface thereof a clutch-face m for a purpose to be hereinatfer more particularly set forth.

N designates a cross-bar, which is preferably formed of strap-iron, which connects the upper portions of the side bars A A and is provided with an aperture n therein to permit the passage of the shaft L therethrough.

O designates a large internally-toothed beveled gear, which is loosely mounted on the shaft L and meshes with the upper side of the beveled gear K³, secured to the upper end of the worm-shaft K², said gear-wheel being supported upon the upper side of the cross-bar N and provided on its under side with an integrally-formed clutch member o, which extends downwardly through the aperture n in the cross-bar.

P designates a collar which is keyed to the shaft L just above the gear-wheel O to prevent vertical movement thereof. The upper portion of said collar is provided with a clutch-face p for a purpose to be hereinafter described.

Q designates a cover which is hinged along one edge to a suitable support secured to the upper surface of the rear end of one of the supporting-beams A and the opposite edge of which is adapted when the cover is in its lowered position to rest upon a suitable support secured to the upper surface of the other supporting-beam A, so that said cover may be readily swung back out of the way when it is desired to obtain access to the hoisting mechanism. The cover Q is provided with a circular aperture q therein, which when the cover is in its lowered position loosely encircles the collar P, keyed to the shaft L, which projects for some distance thereabove.

R designates a sleeve mounted upon the shaft L intermediate the gear-wheels M and O, so as to move longitudinally thereon and to rotate therewith. The upper end of said sleeve is provided with a clutch-face r, adapted to be moved into engagement with the clutch-face o on the under side of the gear-wheel O, and the lower end of said sleeve is provided with a clutch-face r', adapted to be moved into engagement with the clutch-face m, formed on the upper surface of the gear-wheel M. The clutch member R is provided intermediate the ends thereof with an annular groove r², into which are adapted to project the outer ends s of a forked clutch-lever S, the opposite end of said lever being rigidly secured to a transverse rock-shaft S', journaled between the supporting-beams A A.

S² designates a rearwardly-extending lever secured to one end of the rock-shaft S' and terminating in a stirrup S³, adapted to receive the foot of the operator. The operating-lever is preferably formed of spring metal and passes through a vertically-disposed staple S⁴, secured to the inner side of the supporting-beams adjacent said lever, the resiliency of said lever serving to hold the same in frictional engagement with said staple, so that it will be maintained in whatever position to which it may be adjusted.

T designates a laterally-disposed bell-crank lever pivotally secured to the inner side of one of the supporting-beams A, the free end of one arm of which is pivotally secured to a nut T', which is mounted upon a thread I', formed upon the drum-shaft I at one side of the drum H, and the free end of the other arm of which is pivotally connected to a rearwardly-extending rod T², which extends through a slot s', formed in a downwardly-extending arm s², rigidly secured to the rock-shaft S'. The rod T² has adjustably secured thereon on opposite sides of the arm s² nuts t and t'.

The operation of my device as thus far described is as follows: After a wagon has been driven into position to be engaged by the jack B the operator places his foot in the stirrup S³ of the lever S² and elevates the same, which will cause the clutch-lever S to move the clutch member R to bring the clutch-face r' thereof into engagement with the clutch-face m, formed on the upper surface of the gear-wheel M. With the parts in this position and power being applied to the shaft L the drum H will be rotated at a slow rate of speed to cause the elevation of the jack. During the rotation of the drum H the nut T' will be moved outwardly upon the threaded portion I' of the drive-shaft, which, through its connection with the bell-crank lever T, will cause a forward movement of the rod T². During the forward movement of the rod T² the nut t', secured to the end thereof, will contact with the lower end of the downwardly-extending arm s², secured to the rock-shaft S', and move the same inwardly a sufficient amount to cause the clutch-lever S, secured to said rock-shaft, to move the sleeve R a sufficient distance on the shaft L to disengage the clutch-face r' thereof from the clutch-face m of the gear-wheel M, which will instantly stop the rotation of the drum H, and consequently the elevation of the jack B. Inasmuch as the drum H is driven by a worm, it will be obvious that as soon as the rotation thereof is stopped said drum will be locked against any rearward movement. When the wagon has been dumped and the operator desires to effect the lowering thereof, he places his foot in the stirrup S³ of the lever S² and depresses the same, which will cause the clutch-lever S to move the sleeve R upwardly upon the shaft L a sufficient distance to bring the clutch-face r thereof into engagement with the clutch-face o of the upper gear-wheel, thereby causing the drum H to be rotated in the opposite direction to effect the lowering of the jack and the wagon supported thereby. The drum will continue to rotate in this direction until the wagon is completely lowered, when the nut T' will have traveled inwardly a sufficient distance on the threaded portion I' to cause the bell-crank lever T to move a sufficient amount to contact the nut t, carried by the rod T² with the lower end of the downwardly-extending arm s², secured to the rock-shaft S', and move the same outwardly a sufficient distance to cause the clutch-lever S, secured to the rock-shaft, to move the sleeve R a sufficient distance on the shaft L to disengage the clutch-face r thereof from the clutch-face o of the gear-wheel O. Owing to the relative sizes of the gear-wheels M and O, it will be apparent that the jack will be lowered at a much greater rate of speed than it is raised. It will be apparent that the nuts t and t' can be adjusted on the rod T² to effect the stopping of the rotation of the drum H when the jack has reached any desired elevation.

U designates a drag or feeder which is pivotally connected to the lower end of a conveyer U', which is of any suitable construction and which serves to conduct the grain to any suitable point as the same is dumped. The drag or feeder is adapted when in its lower position to lie transversely upon the rear ends of the supporting-beams just in rear of the hoisting mechanism and is normally held in a folded position against the conveyer U' by a suitable spring, so that a wagon may be driven over the jack into position for dumping. The drag or feeder U is provided with the usual conveyer therein, which is secured to sprocket-chains u, which are connected by gearing of any suitable form with the drive-shaft U² of the conveyer U'.

V and V' designate two parallel shafts which are journaled in the lower portions of the sides of the drag and which are provided at the ends thereof with sprocket-wheels b and b', which engage, respectively, with and are driven by the upper and lower sides of the chains u, forming the lower run of the drag-conveyer. The end of the shaft V projects beyond the side of the drag adjacent the hoisting mechanism of the jack and has secured thereto a beveled gear W. The end of the shaft V' which is driven in the opposite direction from shaft V projects beyond the opposite side of the drag.

W' designates an open triangular-shaped casting which is adapted to fit over the projecting end of the shaft V and to be secured to the side of the drag U, the opened portion of said bracket being occupied by the beveled gear W, secured to the end of the shaft V.

X designates a shaft journaled in the apex portion of the bracket W', the upper end of said shaft having secured thereto a gear-wheel X', adapted to mesh with the gear-wheel W, secured to the projecting end of the shaft V, and the lower end of said shaft being provided with a cylindrical recess adapted to receive the projecting end of the shaft L when the drag is lowered to its operative position. The lower end of said shaft is also provided with a clutch-face x, which when the drag is in its operative position is adapted to engage with the clutch-face p, formed on the upper surface of the collar P, which is secured to the upper end of the shaft L, the weight of the drag serving to hold said clutch-faces in operative engagement.

From the above construction it will be apparent that when the drag is lowered to operative position the drive-shaft L of the hoisting mechanism will be automatically connected to the drive-shaft U² of the conveyer U' and caused to rotate therewith. By providing the drag with the shafts V and V', which are driven in opposite directions, it will be apparent that the jack may be positioned on either side of the drag and operatively connected thereto, it being simply necessary to detach the bracket W' and secure the same to the opposite side of the drag, at the same time removing the beveled gear W and securing the same to the projecting end of the shaft V'.

If desired, platform-sections Y, upon which the wagon is driven preparatory to elevating the same to a dumping position, may be placed at each side of the jack. The forward ends of said platform-sections are provided on opposite sides of the jack with forwardly-diverging centering rails Y'. When the wagon is driven onto the platform-sections and over the dump, the front wheels thereof engage with the centering rails Y' and cause the wagon to assume a position over the jack so that the central portion thereof will be engaged by said jack when the same is elevated.

What I claim is—

1. In a wagon-dump, means for elevating one end of a wagon, actuating mechanism therefor, a conveyer movable to a position to receive the discharge directly from the wagon, a power-shaft, means actuated thereby for driving the conveyer, and means connecting the actuating mechanism of the elevating means with the driving means of said conveyer.

2. In a wagon-dump, means for elevating one end of a wagon, actuating mechanism therefor, a conveyer movable to a position to receive the discharge directly from the wagon, a power-shaft, gearing driven thereby for driving the conveyer, and gearing for connecting the actuating mechanism of the elevating means with the gearing of said conveyer.

3. In a wagon-dump, means for raising one end of a wagon, actuating mechanism therefor, a conveyer movable to a position to receive the discharge of the wagon and means operable upon the moving of said conveyer into position for connecting the driving mechanism thereof with the actuating mechanism of the elevating means.

4. In a wagon-dump, means for raising one end of a wagon, actuating mechanism therefor, a conveyer movable to a position to receive the discharge of the wagon, and means carried by the conveyer for operatively connecting the driving mechanism thereof with the actuating mechanism for the elevating means when said conveyer is moved into position.

5. In a wagon-dump, means for elevating one end of a wagon, actuating mechanism therefor, a conveyer movable to a position to receive the discharge of the wagon, and gearing carried by the conveyer for operatively connecting the actuating mechanism thereof with the actuating mechanism for the elevating means when said conveyer is moved into position.

6. In a wagon-dump, means for elevating one end of a wagon, actuating mechanism therefor including a drive-shaft, a conveyer movable to a position to receive the discharge of the wagon, a drive-shaft for said conveyer and means operable upon the moving of said conveyer into position for connecting the drive-shaft thereof with the drive-shaft of the elevating mechanism.

7. In a wagon-dump, means for elevating one end of a wagon, actuating mechanism therefor including a drive-shaft, a conveyer movable to a position to receive the discharge of the wagon, a drive-shaft for said conveyer, and gearing carried by said conveyer for operatively connecting the drive-shaft thereof with the drive-shaft of the elevating mechanism when said conveyer is moved into position.

8. In a wagon-dump, means for elevating one end of a wagon, actuating means therefor including a drive-shaft, a conveyer movable to a position to receive the discharge of the wagon, a drive-shaft for said conveyer, a shaft carried by said conveyer adapted to engage the drive-shaft of the elevating mechanism when said conveyer is moved into position, and gearing between said shaft and the drive-shaft of the conveyer.

9. In a wagon-dump, means for elevating one end of a wagon, actuating mechanism therefor including an upwardly-extending drive-shaft, a conveyer movable to a position to receive the discharge of the wagon, a drive-shaft for said conveyer, a shaft carried by said conveyer adapted to engage the upper end of the drive-shaft of the elevating mechanism when said conveyer is moved into position, and gearing between said shaft and the drive-shaft of the conveyer.

10. In a wagon-dump, means for elevating one end of a wagon, actuating means therefor including a drive-shaft, an endless conveyer movable to a position to receive the discharge of the wagon, and gearing for connecting said conveyer with the drive-shaft of the elevating means when the same is moved into position to receive the discharge of the wagon.

11. In a wagon-dump, means for elevating one end of a wagon, actuating mechanism therefor including a drive-shaft, an endless conveyer movable to a position to receive the discharge of the wagon, a shaft journaled in said conveyer and driven thereby, and gearing for connecting said shaft to the drive-shaft of the elevating mechanism when said conveyer is moved into operative position.

12. In a wagon-dump, means for elevating one end of a wagon, actuating mechanism therefor, a conveyer positioned to receive the discharge of the wagon, and means reversible from one side of the conveyer to the other for connecting the driving mechanism thereof with the actuating mechanism for the elevating means.

13. In a wagon-dump, means for elevating one end of a wagon, actuating mechanism therefor, including a drive-shaft, a conveyer positioned to receive the discharge of the wagon, a drive-shaft for said conveyer, and gearing reversible from one side of the conveyer to the other for connecting the drive-shaft thereof with the drive-shaft of the elevating mechanism.

14. In a wagon-dump, means for elevating one end of a wagon, actuating mechanism therefor including a drive-shaft, a conveyer movable to a position to receive the discharge of the wagon, a drive-shaft for said conveyer, and gearing reversible from one side of the conveyer to the other side thereof for connecting the drive-shaft of the conveyer with the drive-shaft of the elevating means when said conveyer is moved to operative position.

15. In a wagon-dump, means for elevating one end of a wagon, actuating mechanism therefor including a drive-shaft, a conveyer positioned to receive the discharge of the wagon, a pair of oppositely-driven shafts carried by said conveyer, and gearing for interchangeably connecting either of said shafts with the drive-shaft of the elevating mechanism.

16. In a wagon-dump, means for elevating one end of a wagon, actuating mechanism therefor including a drive-shaft, a conveyer positioned to receive the discharge of the wagon, a pair of oppositely-driven shafts carried by said conveyer, and gearing reversible from one side of said conveyer to the other side thereof for connecting either of said shafts with the drive-shaft of the elevating mechanism.

17. In a wagon-dump, means for elevating one end of a wagon, actuating mechanism therefor including a drive-shaft, a conveyer movable to a position to receive the discharge of the wagon, a pair of oppositely-driven shafts carried by said conveyer, and gearing reversible from one side of said conveyer to the other side thereof for connecting either of said shafts with the drive-shaft of the elevating mechanism, when said conveyer is moved to operative position.

18. In a device of the character described, means for elevating the forward end of a wagon, actuating mechanism therefor including a hoisting-drum and two sets of gearing therefor, a clutch member arranged for engagement with either set of gearing, means for moving said clutch member into engagement with either set of gearing, and means automatically operable by the rotation of the drum for moving said clutch member out of engagement with both sets of gearing.

19. In a device of the character described, means for elevating the forward end of a wagon, actuating mechanism therefor including a hoisting-drum and two sets of gearing therefor, a clutch member arranged for engagement with either set of gearing, means for manually moving said clutch member into engagement with either set of gearing, and adjustable means automatically operable by the rotation of the drum for moving said clutch member out of engagement with both sets of gearing.

20. In a device of the character described, means for elevating the forward end of a wagon, actuating mechanism therefor including a drum-shaft having a threaded portion, a drum secured to said drum-shaft, two sets of gearing for driving said drum-shaft in opposite directions, a clutch member arranged for engagement with either set of gearing, means for moving said clutch member into engagement with either set of gearing, a nut mounted to travel on the threaded portion of the drum-shaft, and a connection between said nut and clutch member.

21. In a device of the character described, means for elevating the forward end of a wagon, actuating mechanism therefor including a drum-shaft having a threaded portion, a drum secured to said drum-shaft, gearing for driving said drum including a clutch member, a nut mounted to travel on the threaded portion of the drum-shaft, and a connection between said nut and clutch member.

22. In a device of the character described, means for elevating the forward end of a wagon, actuating mechanism therefor including a drum-shaft having a threaded portion, a drum secured to said drum-shaft, gearing for driving said drum, a clutch member in said gearing, a nut mounted to travel on the threaded portion of the drum-shaft, and an adjustable connection between said nut and clutch member.

23. In a device of the character described, means for elevating the forward end of a wagon, actuating mechanism therefor including a drum-shaft, a drum secured thereto, two sets of gearing for driving said drum in opposite directions, a clutch member arranged for engagement with either set of gearing, a rock-shaft having an arm engaging said clutch member and a downwardly-extending arm, a longitudinally-movable rod extending through the downwardly-extending arm of the rock-shaft and provided with stops at either side thereof, and means operable upon the rotation of the drum-shaft for imparting a longitudinal movement to said rod.

24. In a device of the character described, means for elevating the forward end of a wagon, actuating mechanism therefor including a drum-shaft, having a threaded portion, a drum secured to said drum-shaft, two sets of gearing for driving said drum-shaft in opposite directions, a clutch member arranged for engagement with either set of gearing, a rock-shaft having an arm engaging said clutch member and a downwardly-extending arm, a longitudinally-movable rod extending through the downwardly-extending arm of the rock-shaft and provided with adjustable stops at either side thereof, a nut mounted to travel on the threaded portion of the drum-shaft, and a bell-crank lever, the free ends of the arm of said lever being pivotally connected the one to said nut and the other to the end of said longitudinally-movable rod.

25. In a device of the character described, means for elevating the forward end of a wagon, actuating mechanism therefor including a drum, two sets of gearing for driving said drum in opposite directions, a clutch member arranged for engagement with either set of gearing, a rock-shaft having an arm engaging said clutch member, means for actuating said rock-shaft to cause said clutch member to engage with either set of gearing, and means automatically operable upon the rotation of the drum for disengaging said clutch member.

26. In a wagon-dump, a supporting member, a jack pivotally secured thereto, toggle-links interposed between said jack and supporting member, a hoisting-drum, an idler secured to said supporting member, a sheave secured to said supporting member in rear of said idler, a sheave secured to one of the toggle-links and adapted when the jack is in its lowermost position to extend below the upper surface of the idler secured to the supporting member, and a cable secured to said hoisting-drum and passing around said sheave and over said idler.

27. In a device of the character described, means for engaging the under side of a wagon medially thereof to effect the elevation of one end thereof, and means for centering said wagon over said elevating means.

28. In a device of the character described, a jack adapted to engage the under side of a wagon medially thereof to effect the elevation thereof, and means positioned at each side of said jack for centering the wagon thereover when driven into position to be dumped.

29. In a device of the character described, a jack adapted to engage the under side of a wagon medially thereof to effect the elevation of one end thereof, and forwardly-diverging centering rails positioned at each side of said jack.

30. In a wagon-dump, a power-shaft, elevating mechanism, a conveyer movable to a position to receive the discharge of a wagon, and means acting automatically when said conveyer is moved into operative position to connect the power-shaft and elevating mechanism.

31. In a wagon-dump, a power-shaft, elevating mechanism, a conveyer movable to a position to receive the discharge of a wagon, and gearing carried by the conveyer acting automatically to connect the power-shaft and elevating means when said conveyer is moved into operative position.

In testimony whereof I affix my signature in presence of two witnesses.

JOHN F. WHITE.

Witnesses:
HELEN M. BROWNING,
M. M. THOMPSON.